(12) United States Patent
Jones

(10) Patent No.: US 8,479,836 B2
(45) Date of Patent: Jul. 9, 2013

(54) MACHINE FOR AERATING SOIL

(76) Inventor: Jerry White Jones, Trenton, TN (US)

( * ) Notice: Subject to any disclaimer, the term of this patent is extended or adjusted under 35 U.S.C. 154(b) by 0 days.

(21) Appl. No.: 13/153,461

(22) Filed: Jun. 5, 2011

(65) Prior Publication Data
US 2012/0305275 A1  Dec. 6, 2012

(51) Int. Cl.
*A01B 33/00* (2006.01)
(52) U.S. Cl.
USPC .................................. 172/125; 172/21
(58) Field of Classification Search
USPC .................... 172/21, 22, 94, 95, 125
See application file for complete search history.

(56) References Cited

U.S. PATENT DOCUMENTS

| | | | | | |
|---|---|---|---|---|---|
| 3,889,761 | A | * | 6/1975 | Rogers | 172/706 |
| 4,422,510 | A | * | 12/1983 | de Ridder | 172/21 |
| 4,819,734 | A | * | 4/1989 | Classen | 172/22 |
| 4,867,244 | A | * | 9/1989 | Cozine et al. | 172/22 |
| 4,926,947 | A | * | 5/1990 | Cozine et al. | 172/22 |
| 5,207,278 | A | * | 5/1993 | Hatlen | 172/22 |
| 5,570,746 | A | * | 11/1996 | Jones et al. | 172/22 |
| 5,797,458 | A | * | 8/1998 | Simon et al. | 172/2 |
| 5,810,092 | A | * | 9/1998 | Selvatici | 172/94 |
| 5,988,290 | A | * | 11/1999 | Banks | 172/21 |
| 6,003,613 | A | * | 12/1999 | Reincke | 172/21 |
| 6,199,637 | B1 | * | 3/2001 | Wiedenmann | 172/21 |
| 7,293,612 | B1 | * | 11/2007 | Petersen et al. | 172/22 |
| 7,472,759 | B2 | * | 1/2009 | Petersen | 172/22 |
| 7,730,960 | B1 | * | 6/2010 | Knight et al. | 172/21 |
| 8,051,917 | B2 | * | 11/2011 | Wiedenmann | 172/21 |
| 2002/0056554 | A1 | * | 5/2002 | Hargreaves et al. | 172/21 |
| 2009/0166048 | A1 | * | 7/2009 | Wiedenmann | 172/21 |

* cited by examiner

*Primary Examiner* — Jamie L McGowan

(57) ABSTRACT

A machine for aerating soil has a frame. A gear box is attached to the frame. A crank assembly is driven by the gear box. A parallel arm is pivotally attached to the crank assembly by a crank arm and is pivotally attached to the frame. A tine assembly arm is pivotally attached to the frame and is pivotally attached to the parallel arm at a fixed point. A rigid tine holder is pivotally attached to the tine assembly arm and is pivotally attached to the parallel arm and extends beyond the parallel arm.

The connection of the tine assembly arm, parallel arm and tine holder to the crank assembly ensure that the tines are driven straight into the soil. The lack of arc ensures that the turf surface is minimally disturbed.

2 Claims, 4 Drawing Sheets

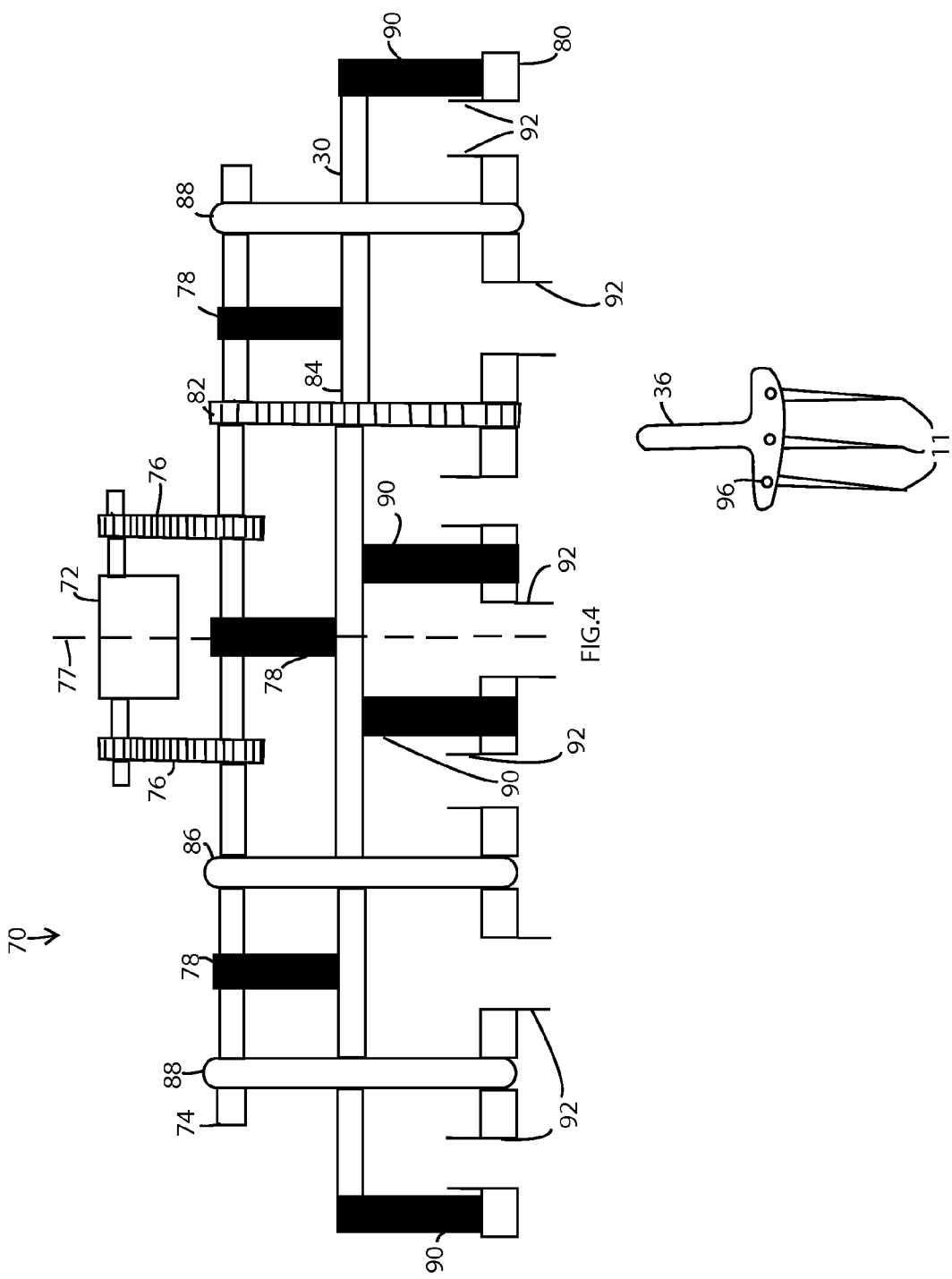

MACHINE FOR AERATING SOIL

BACKGROUND OF THE INVENTION

In grass fields and other lawn areas, which experience sustained vehicular and pedestrian traffic, the turf surface and underlying soil can become undesirably compacted. The problems associated with soil compaction are that rain and fertilizing chemicals are prevented from fully penetrating the ground. The short-term effect of such a condition is that the field will remain soggy for longer periods after a rain, and the long-term effect is the prevention of deep and healthy root system and proper grass growth. Turf aeration is the process of creating channels in the soil so that water, air, and fertilizers can penetrate the ground and be dispersed effectively throughout the soil.

A number of devices have been invented to aerate turf, however most of them use an arc motion to drive the tines into the soil. The arc motion tends to disrupt the top of the turf, by increasing the size of the opening greater than necessary, which is particularly problematic on golf courses. The arc motion also tends to cause the tine to not penetrate to its full depth and cause inconsistent depth of penetration, as the energy to drive the tine is spread out over a greater surface. Another problem with earlier turf aerators is they tend to require substantial maintenance.

Thus there exists a need for a turf aerator that provides consistent soil penetration depth, does not disrupt the turf surface unnecessarily, and does not require constant maintenance

BRIEF SUMMARY OF INVENTION

A machine for aerating soil that overcomes these and other problems has a frame. A gear box is attached to the frame. A crank assembly is driven by the gear box. A parallel arm is pivotally attached to the crank assembly by a crank arm and is pivotally attached to the frame. A tine assembly arm is pivotally attached to the frame and is pivotally attached to the parallel arm at a fixed point. A rigid tine holder is pivotally attached to the tine assembly arm and is pivotally attached to the parallel arm and extends beyond the parallel arm.

The connection of the tine assembly arm, parallel arm, and tine holder to the crank assembly ensures that the tines are driven straight into the soil. The lack of arc ensures that the turf surface is minimally disturbed.

The crank assembly has each of the cranks aligned at a unique angle so that each tine holder or set of tines is driven into the soil one at a time, which means that the entire weight of the machine is applied to each tine assembly. This ensures consistent depth of the tines. The arrangement is also balanced so that no counterweights are necessary.

A heavy duty drive assembly consists of a pair of balanced chain and sprocket assemblies that connect the gear box to the main drive shaft. The main drive shaft is connected to the crank assembly by at least one chain and sprocket assembly and a belt drive assembly. The chain and sprocket assembly and the belt drive assembly are equidistant from a centerline of the main drive shaft and crank assembly. This ensures that there is no torque on the main drive shaft or crank assembly. Additional balanced belt drive assemblies may also be used. This reduces the maintenance costs.

BRIEF DESCRIPTION OF THE SEVERAL VIEWS OF THE DRAWINGS

FIG. 4 is a top view of the drive mechanism in accordance with one embodiment of the invention; and FIG. 5 is a front view of a tine holder and tines in accordance with one embodiment of the invention.

DETAILED DESCRIPTION OF THE INVENTION

The invention relates to a machine for aerating soil that has a frame. A gear box is attached to the frame. A crank assembly is driven by the gear box. A parallel arm is pivotally attached to the crank assembly by a crank arm and is pivotally attached to the frame. A tine assembly arm is pivotally attached to the frame and is pivotally attached to the parallel arm at a fixed point. A rigid tine holder is pivotally attached to the tine assembly arm and is pivotally attached to the parallel arm and extends beyond the parallel arm. The connection of the tine assembly arm, parallel arm, and tine holder to the crank assembly ensure that the tines are driven straight into the soil. The lack of arc ensures that the turf surface is minimally disturbed.

The crank assembly has each of the cranks aligned at a unique angle so that each tine holder or set of tines is driven into the soil one at a time, which means that the entire weight of the machine is applied to each tine assembly.

This ensures consistent depth of the tines. The arrangement is also balanced so that no counterweights are necessary.

A heavy duty drive assembly consists of a pair of balanced chain and sprocket assemblies that connect the gear box to the main drive shaft. The main drive shaft is connected to the crank assembly by at least one chain and sprocket assembly and a belt drive assembly. The chain and sprocket assembly and the belt drive assembly are equidistant from a centerline of the main drive shaft and crank assembly. This ensures that there is no torque on the main drive shaft or crank assembly. Additional balanced belt drive assemblies may also be used. This reduces the maintenance costs.

Figure 1:
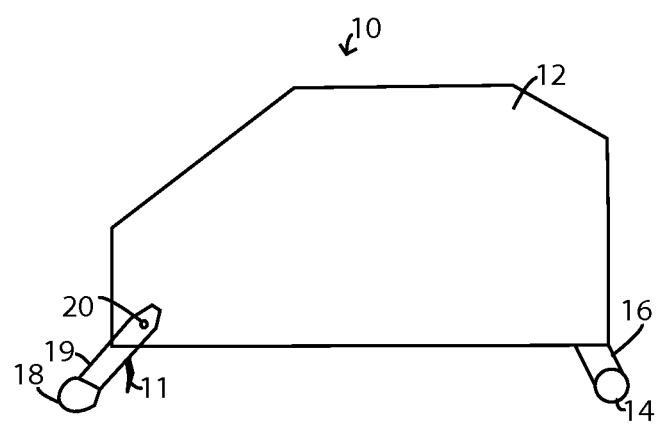
FIG. 1 is a side view of a turf aerator in accordance with one embodiment of the invention.

FIG. 1 is a side view of a turf aerator 10 in accordance with one embodiment of the invention. The turf aerator 10 has housing 12 attached to a frame. A first set of rollers 14 are attached to the frame by a set of roller arms 16. A second roller 18 is attached to a roller arm 19, which is pivotally 20 attached to the frame. A tine 11 extends below the housing 12. The turf aerator 10 is designed to be pulled by a tractor.

Figure 2:
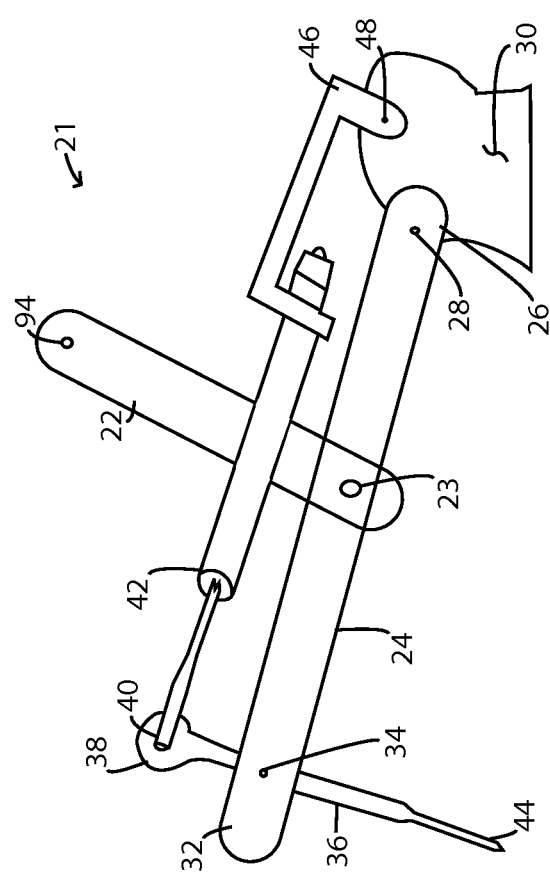
FIG. 2 is a side view of a tine drive mechanism in accordance with one embodiment of the invention.

FIG. 2 is a side view of a tine drive mechanism 21 in accordance with one embodiment of the invention. A crank arm 22 is pivotally 23 attached to a parallel arm 24. The parallel arm 24 has a first end 26 pivotally 28 attached to the frame 30. A second end 32 of the parallel arm 24 is pivotally 34 attached to a tine holder 36. The tine holder 36 has a proximal end 38 pivotally 40 attached to a tine assembly arm 42. The pivot 34 is between the proximal end 38 of the tine holder 36 and the distal end 44 of the tine holder 36 and a fixed point of attachment. The tine assembly arm 42 has a firt end pivotally 40 attached to the tine holder 38 and a second end 46 pivotally 48 attached to the frame 30.

Figure 3:
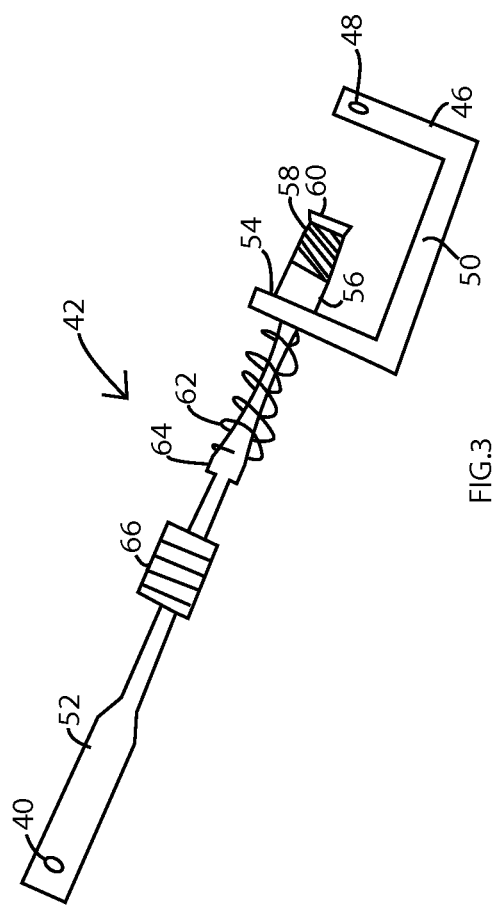
FIG. 3 is a cross sectional side view of tine assembly arm in accordance with one embodiment of the invention.

FIG. 3 is a cross sectional side view of tine assembly arm 42 in accordance with one embodiment of the invention. The tine assembly arm 42 has a second end 46 with a C-shaped bracket 50 and a first end having a pivot 40 with a rod 52 that extends through an end 54 of the C-shaped bracket 50. A stop 56 is adjacent to C-shaped bracket 50. A rubber bumper 58 is adjunct to the stop 54. A washer 60 is attached to the rod 52, which allows the rod 52 to slide through the end of the C-shaped bracket 50, the stop 56, and bump against bumper 58. A spring 62 is wrapped around the rod 52 and is trapped between stop 64 and the end of C-shaped bracket 50. A tube (not shown) covers spring and attaches to tube end 66. This prevents the spring 62 from getting debris in the mechanism and degrading its performance.

FIG. 4 is a top view of the drive mechanism 70 in accordance with one embodiment of the invention. The drive mechanism 70 has a gear box 72 that attaches to the drive shaft of tractor. The gear box 72 is attached to the main drive shaft 74 by a pair of balanced chain and sprocket assemblies 76. The balance is provided by having the pair of chain and sprocket assemblies 76 and by placing them equidistant from a centerline 77 of the main drive shaft 74 and the centerline of the gearbox 72. A number of bearing bracket 78 hold the main drive shaft 74 to the frame 30. The main drive shaft 74 is attached to the crank assembly 80 by a chain and sprocket assembly 82. An opening 84 in the frame 30 allows the chain to pass through the frame 30. A balanced belt drive assembly 86 also connects the main drive shaft 74 to the crank shaft 80. The belt drive 86 and the chain and sprocket assembly 82 are equidistant from the centerline 77 of the main drive shaft and the crank shaft 80. Additional pairs of belt drives assemblies 88 that are balance may also be provided. This balance arrangement eliminates torque on the main drive shaft 74 and the crankshaft 80. The crankshaft 80 is connected to the frame by bearing brackets 90. The crankshaft 80 has a number of cranks 92 each of which has a unique angular position on the crankshaft 80, which causes each tine holder 36 to enter the soil one at a time. The arrangement is also balanced so that no counterweights are necessary. In one embodiment, the cranks 92 are rotated ninety degrees to the left starting from the left and are rotated ninety degrees to the right starting from the right, which results in a forty five degree angle between the center two cranks 92. This result in one set of tines enter the soil at any time and another set of tine being removed from the soil simultaneously. This pushing and pulling effect is balanced along the centerline 77. The cranks 92 pivotally 94 (FIG. 2) attach to the crank arms 22 of the tine drive mechanism.

FIG. 5 is a front view of a tine holder 36 and tines 11 in accordance with one embodiment of the invention. The tines 11 are attached to the tine holder 36 by screws, bolts, or other quick connect mechanism 96, which allows the tine 11 to be changed quickly and easily. It also allows for almost any pattern of holes and type of tines.

The cranks 90 drive the crank arm 22 of the tine drive mechanism 21. The tine drive mechanism 21 drives the tines straight into the soil. When the tines are driven into the soil the spring 62 is compressed and the rod 52 of the tine arm assembly 42 slides away from bumper 58.

The connection of the tine assembly arm, parallel arm and tine holder to the crank assembly ensure that the tines are driven straight into the soil. The lack of arc ensures that the turf surface is minimally disturbed.

The crank assembly has each of the cranks aligned at a unique angle so that each tine holder or set of tines is driven into the soil one at a time, which means that the entire weight of the machine is applied to each tine assembly.

This ensures consistent depth of the tines. The arrangement is also balanced so that no counterweights are necessary.

The heavy duty drive assembly reduces maintenance costs. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A machine for aerating soil, comprising:
a frame;
a gear box attached to the frame;
a crank assembly driven by the gear box;
a parallel arm pivotally attached to the crank assembly by a crank arm and pivotally attached to the frame;
a main drive shaft coupled to the gear box by a pair of balanced chain and sprocket assemblies;
a chain and sprocket assembly connecting the main drive shaft to the crank assembly;
a belt drive assembly connecting the main drive shaft to the crank assembly;
a tine assembly arm pivotally attached to the frame and pivotally attached to the tine holder at a fixed point; and
a rigid tine holder pivotally attached to the tine assembly arm and pivotally attached to the parallel arm and extending beyond the parallel arm.

2. The machine of claim 1, wherein the belt drive assembly and the chain and sprocket assembly are equidistant from a centerline of the main drive shaft.

* * * * *